(12) United States Patent
Zhang et al.

(10) Patent No.: US 10,509,532 B2
(45) Date of Patent: *Dec. 17, 2019

(54) PROGRESS BAR WITH GRAPHICAL EFFECTS TO INDICATE DOWNLOAD PROGRESS AND CONNECTION STATE

(71) Applicant: Tencent Technology (Shenzhen) Company Limited, Shenzhen (CN)

(72) Inventors: Jing Zhang, Shenzhen (CN); Meina Li, Shenzhen (CN); Yang Li, Shenzhen (CN); Danzhi Chen, Shenzhen (CN); Nian Liu, Shenzhen (CN); Qunli Ma, Shenzhen (CN); Chen Zhang, Shenzhen (CN); Yufei Liu, Shenzhen (CN); Jun Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 246 days.

This patent is subject to a terminal disclaimer.

(21) Appl. No.: 15/630,647

(22) Filed: Jun. 22, 2017

(65) Prior Publication Data
US 2017/0308263 A1     Oct. 26, 2017

Related U.S. Application Data

(63) Continuation of application No. 14/408,538, filed as application No. PCT/CN2013/078126 on Jun. 27, 2013, now Pat. No. 9,720,561.

(30) Foreign Application Priority Data

Jun. 28, 2012  (CN) .......................... 2012 1 0218461

(51) Int. Cl.
G06F 3/0481   (2013.01)
G06F 16/957   (2019.01)
G06F 3/0484   (2013.01)

(52) U.S. Cl.
CPC ...... *G06F 3/04812* (2013.01); *G06F 3/04847* (2013.01); *G06F 16/957* (2019.01)

(58) Field of Classification Search
None
See application file for complete search history.

(56) References Cited

U.S. PATENT DOCUMENTS 5,953,010 A * 9/1999 Kampe ................... G06F 9/451
                                                   715/772
6,965,863 B1   11/2005 Zuberec et al.
(Continued)

FOREIGN PATENT DOCUMENTS

CN        101295244 A       10/2008

OTHER PUBLICATIONS (Ged, Mead, WPF: How to create a Reversing ProgressBar, Vbcity—The .NET Developer Community, available at http://vbcity.com/blogs/xtab/archive/2009/12/05/wpf-how-to-create-a-reverse-progressbar.aspx (Year: 2009).*

(Continued)

*Primary Examiner* — Tuan S Nguyen
(74) *Attorney, Agent, or Firm* — Patterson + Sheridan, LLP (57) ABSTRACT

The disclosure provides method, apparatus and terminal for page refreshing. The method includes: outputting a preset animation interface within a displayed page when a page refreshing operation is performed, which is a longitudinal bar with a length substantially equal to a width of the displayed page and comprises a preset logo, moving cursors having a plurality of cursor seeds emitted from the preset (Continued)

logo and that move toward the refresh progress bar starting from the preset logo along the length of the longitudinal bar and a refresh progress bar, wherein the refresh progress bar and the preset logo are positioned apart from each other, and a length of the refresh progress bar increases towards the preset logo as the moving cursors arrive at the refresh progress bar; and reducing transparency of the moving cursor to a predetermined value when the length of the refresh progress bar no longer increases.

4 Claims, 6 Drawing Sheets

(56) References Cited

U.S. PATENT DOCUMENTS

| | | | |
|---|---|---|---|
| 7,451,350 | B2 | 11/2008 | Cherny et al. |
| 2004/0078453 | A1 | 4/2004 | Bhogal et al. |
| 2009/0281645 | A1 | 11/2009 | Kitahara et al. |
| 2010/0103124 | A1 | 4/2010 | Kruzeniski et al. |
| 2010/0313159 | A1 | 12/2010 | Decker et al. |
| 2011/0106709 | A1* | 5/2011 | Puura ............... G06Q 20/20 705/64 |
| 2011/0117867 | A1 | 5/2011 | Fridman |
| 2011/0302524 | A1* | 12/2011 | Forstall ............ G06F 16/9577 715/781 |
| 2012/0096383 | A1 | 4/2012 | Sakamoto et al. |
| 2013/0046641 | A1 | 2/2013 | DeVree |
| 2013/0212434 | A1 | 8/2013 | Janky et al. |
| 2013/0239040 | A1 | 9/2013 | Kaleta et al. |

OTHER PUBLICATIONS

Office Action and Search Report dated Mar. 31, 2017 for Chinese Application No. CN20121218461.7, filed Jun. 28, 2012, pp. 1-8.
PCT Search Report and Written Opinion for PCT/CN2013/078126 dated Sep. 19, 2013.
Office Action and Search Report dated Mar. 31, 2017 for Chinese Application No. CN201210218461.7, filed Jun. 28, 2012, pp. 1-8.

* cited by examiner

PROGRESS BAR WITH GRAPHICAL EFFECTS TO INDICATE DOWNLOAD PROGRESS AND CONNECTION STATE

This application is a continuation application of U.S. patent application Ser. No. 14/408,538 filed on Dec. 16, 2014, which claims the priority benefit of Chinese patent application No. 201210218461.7 filed on Jun. 28, 2012, the contents of which are incorporated by reference herein in their entirety.

FIELD OF THE INVENTION

The invention relates to MicroBlog field, and particularly, to method, apparatus and terminal for page refreshing.

BACKGROUND

MicroBlog is a user's relationship based information sharing, dissemination and acquisition platform. Users can build personal communities through WEB, WAP (Wireless Application Protocol) and various client terminals, update information with a text including about 140 characters and attain instant sharing. With an increase in mobile terminal users, MicroBlog attracts more and more users. With widespread popularity of MicroBlog and in order for MicroBlog users to get better sense of experience, how to make page refresh is becoming a problem to be addressed by operators.

In prior arts, when a user clicks on a refresh button on its terminal, a refresh icon is displayed on the terminal, and during refresh process, the refresh icon freely rotates in 360 degree, and when refresh contents have been pulled, the refresh icon automatically disappears.

In the process of implementing the present invention, the present inventors have found that at least the following technical problems exist in the prior arts.

During refresh process, only the refresh icon is in its autorotation, so users cannot know the progress of pulling refresh contents, which degrades user's experience, and because the refresh icon rotates solely, animation is too thin and thereby users cannot get better sense of the experience.

SUMMARY OF THE INVENTION

The present invention provides a method, apparatus and terminal for page refreshing in order to improve user's sense of experience when using MicroBlog. The technical solution is described as below.

In some embodiments, a method for page refreshing is provided. The method comprises: outputting a preset animation interface within a graphically displayed page when a page refreshing operation is performed, wherein the preset animation interface is a longitudinal bar with a length substantially equal to a width of the graphically displayed page, wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar; and reducing transparency of the moving cursor to a predetermined value when the length of the refresh progress bar no longer increases.

In some embodiments, an apparatus for page refreshing is provided. The apparatus comprises: an animation outputting device configured to output a preset animation interface within a graphically displayed page when a page refreshing operation is performed, wherein the preset animation interface is a longitudinal bar with a length substantially equal to a width of the graphically displayed page, wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar, and an adjusting device configured to reduce transparency of the moving cursor to a predetermined value when the length of the refresh progress bar no longer increases.

In some embodiments, a terminal is provided. The terminal comprises a touch screen display, one or more processors, memory and one or more programs, wherein the one or more programs are stored in the memory and are configured to be executed by the one or more processors, the one or more programs comprise instructions for performing the following operations: outputting a preset animation interface within a graphically displayed page when a page refreshing operation is performed, wherein the preset animation interface is a longitudinal bar with a length substantially equal to a width of the graphically displayed page, wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar; and reducing transparency of the moving cursor to a predetermined value when the length of the refresh progress bar no longer increases.

In some embodiments, a non-transitory computer readable storage medium wherein said computer readable storage medium has one or more programs stored thereon, the one or more programs are executed by one or more processors to perform a sliding control method, wherein the method comprises: outputting a preset animation interface within a graphically displayed page when a page refreshing operation is performed, wherein the preset animation interface is a longitudinal bar with a length substantially equal to a width of the graphically displayed page, wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar; and reducing transparency of the moving cursor to a predetermined value when the length of the refresh progress bar no longer increases.

The technical solution of the present embodiments can attain the following technical effects:

when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursor arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

DESCRIPTION OF THE DRAWINGS

In order to clearly describe the technical solution of the present embodiments, the figures used in the description of the embodiments are simply described as below.

Obviously, the described figures relate to some of embodiments of the present invention and for a person skilled in the art, other figures can be obtained according to these figures without any inventive efforts.

DETAILED DESCRIPTION

In order to make the objects, technical solutions and advantages of the invention more apparent, the present embodiments will be further illustrated in details in connection with accompanying figures hereinafter.

Embodiment 1

Figure 1:
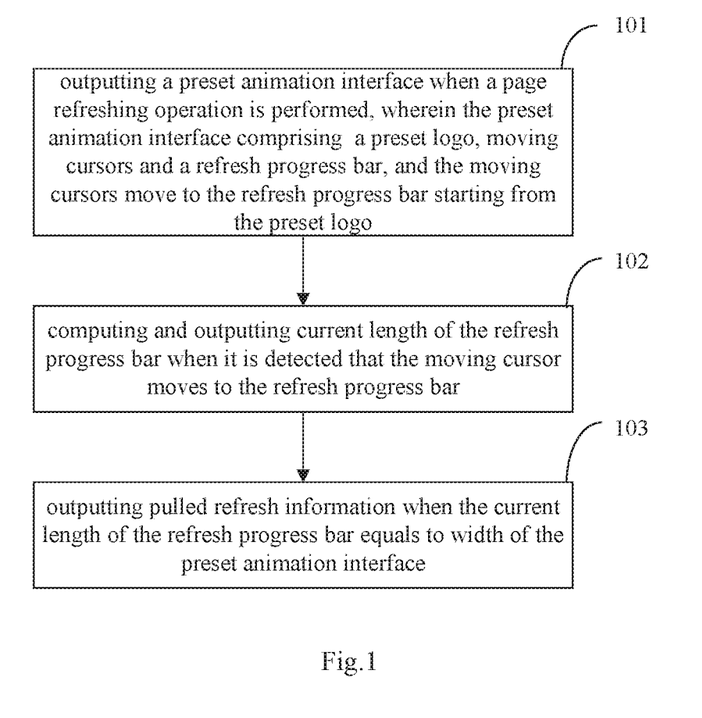
FIG. 1 is a flow diagram showing a method for page refreshing according to a first embodiment of the invention.

By referring to FIG. 1, a method for page refreshing is provided in the embodiment. The method comprises:

101. outputting a preset animation interface when a page refreshing operation is performed, wherein the preset animation interface comprising a preset logo, moving cursors and a refresh progress bar, and the moving cursors move to the refresh progress bar starting from the preset logo;

102. calculating and outputting current length of the refresh progress bar when it is detected that the moving cursors arrive at the refresh progress bar; and 103. outputting pulled refresh information when the current length of the refresh progress bar equals to width of the preset animation interface.

Preferably, said outputting a preset animation interface comprises but is not limited to:

outputting the preset animation interface at bottom of the page; or outputting the preset animation interface at top of the page.

Wherein, said calculating current length of the refresh progress bar comprises:

acquiring amount of currently pulled refresh information;

calculating actual refresh progress based on the amount of currently pulled refresh information and total amount of refresh information need to be pulled; and obtaining the current length of the refresh progress bar by multiplying the actual refresh progress by the width of the preset animation interface.

Wherein, said outputting pulled refresh information comprises:

outputting data of refreshed information, and outputting the total amount of pulled refresh information in a form of floating window.

Optionally, the method further comprises:

reducing transparency of the moving cursor to a predetermined value after calculation and outputting of the current length of the refresh progress bar and if length of the refresh progress bar does not increase.

Optionally, the moving cursors comprise multiple groups of moving cursor units, and wherein each group of moving cursor units comprises a predetermined number of cursor seeds, and acceleration of each group of moving cursor units is in an arithmetic sequence.

The present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

Embodiment 2

Figure 2:
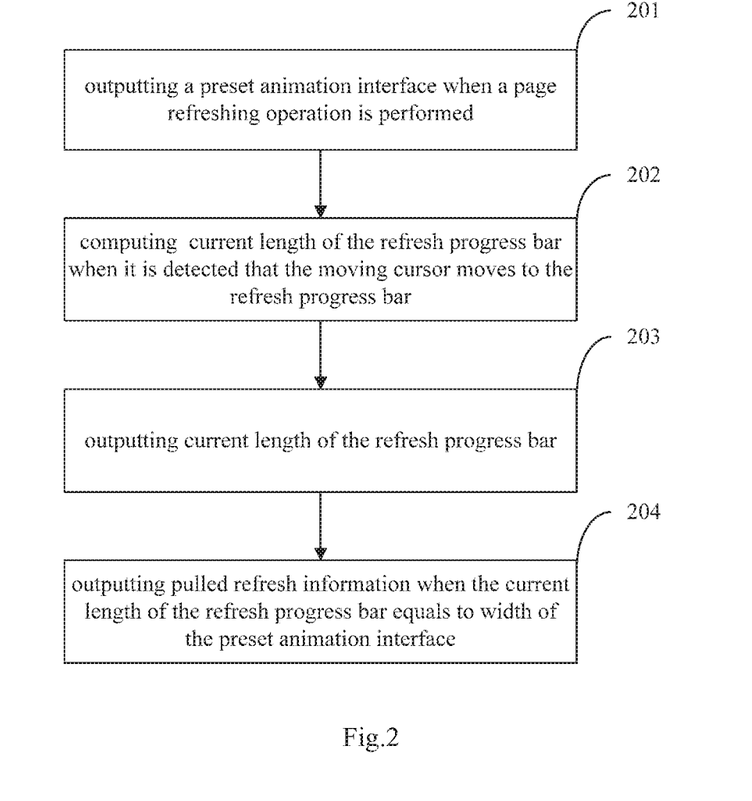
FIG. 2 is a flow diagram showing a method for page refreshing according to a second embodiment of the invention.

A method for page refreshing is provided in the present embodiment. For easy to understand, the method in the present embodiment is described in detail by taking page refreshing on a MicroBlog interface as an example. Referring to FIG. 2, the method comprises:

201. outputting a preset animation interface when a page refreshing operation is performed.

In this step, when a user click a refresh button on the MicroBlog interface to refresh data, the MicroBlog platform performs a refreshing operation, pull to refresh data, and meanwhile output a preset animation interface on a display interface. The preset animation interface comprises a preset logo, moving cursors and a refresh progress bar. The moving cursors move to the refresh progress bar starting from the preset logo, the visual effects of which is that the preset logo is emitting the moving cursors. In the present embodiment, preferably, the preset animation interface is consistent with involved page in width, but may be smaller than the width of the involved page. The present embodiment does not make specific limitation thereto.

In the present embodiment, the preset logo may be a MicroBlog logo itself or any other logo for advertisement, to which the present embodiment is not specifically limited. The preset logo may be in the middle or at one end of the preset animation interface. In the case that the preset logo is at one end of the preset animation interface, the moving cursors move from the end to the other end of the preset animation interface, and the refresh progress bar begins to grow from the end which is opposite to the preset logo. For example, in the case that the preset logo is at left end of the preset animation interface, the moving cursors move from the left end to right end of the preset animation interface, and the refresh progress bar begins to grow from the right end of the preset animation interface. In the case that the preset logo is in the middle of the preset animation interface, the moving cursors move to both ends of the preset animation interface simultaneously, and the refresh progress bar begins to grow from both ends of the preset animation interface simultaneously and when the refresh progress bar starting from the both ends grows to reach to a position where the preset logo is located, all of refresh information have been pulled, or the refresh progress bar begins to grow from one end (such as left end) of the preset animation interface, and when the refresh progress bar grows to reach to a position where the preset logo is located, the moving cursors move to the right end of the preset animation interface and the refresh progress bar begins to grow from the right end of the animation interface and when the refresh progress bar grows to reach to a position where the preset logo is located, all of refresh information have been pulled. The embodiment is not specifically limited to the setting of the specific location of the preset log in the presser animation interface.

The preset animation interface in this embodiment occupies only a small portion of involved MicroBlog displaying page and may be at the bottom or top of the page, to which the present embodiment is not specifically limited. In the present embodiment, the moving cursors comprise multiple groups of moving cursor units, and each group of moving cursor units comprises a predetermined number of cursor seeds. Preferably, accelerations of every sets of moving cursor units are in an arithmetic sequence in order for better animation effect, of course, accelerations of every sets of moving cursor units may be identical, to which the present embodiment is not specifically limited. The number of seeds in each group of moving cursor units may be one, two, three, four, or five, etc., to which the present embodiment is not specifically limited, but the number of seeds in each group of moving cursor units cannot exceeds total width of the page. The initial length of the refresh progress bar is zero and grows continuously with moving of the cursors.

Figure 3:
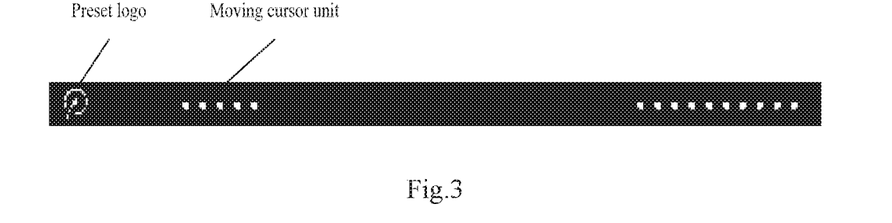
FIG. 3 is a diagram showing an animation interface according to the second embodiment of the invention.

As shown in FIG. 3 showing a preset animation interface, the preset logo is an image of a dandelion, and each group of broadcasting moving units includes 5 seeds moving from left to right edge of the page. Each frame of the animation takes 0.2 seconds, and moving distance of the first set equals to the width occupied by one seed, moving distance of the second set equals to the width occupied by two seeds, moving distance of the third set equals to the width occupied by three seeds and moving distance of the fourth set equals to the width occupied by four seeds, and so on.

In the present embodiment, when MicroBlog platform performs a refreshing operation, the preset animation interface displays animation according to a preset rule such that a user can get better sense of experience when waiting for refreshing progress.

202. calculating current length of the refresh progress bar when it is detected that the moving cursors arrive at the refresh progress bar.

In this step, the moving cursors, during pulling of data, consciously move in the direction of the refresh progress bar, and when it is detected that the moving cursors arrive at the refresh progress bar, the method calculates length of the refresh progress bar to be increased. Said calculation comprises:

acquiring amount of currently pulled refresh information;

calculating actual refresh progress based on the amount of currently pulled refresh information and total amount of refresh information need to be pulled; and obtaining the current length of the refresh progress bar by multiplying the actual refresh progress by the width of the preset animation interface.

The actual refresh progress mentioned above is a percentage of the amount of currently pulled refresh information to total amount of refresh information need to be pulled. In the present embodiment, the amount of refresh information pulled each time may be set in advance, for example, 10, 20 or 25 pieces of information each time, to which the present embodiment is not specifically limited.

With calculation of the current length of the refresh progress bar based on the amount of currently pulled refresh information, pulling progress of involved network is associated with increase of the refresh progress bar such that a user can get to know network conditions from changes of the refresh progress bar, and thereby the user's sense of experience can be further improved.

203. outputting the current length of the refresh progress bar.

In the present embodiment, after the current length of the refresh progress bar is obtained through the calculation, the refresh progress bar with a corresponding length is displayed in the preset animation interface. The refresh progress bar may be displayed in a predetermined color, and the predetermined color may or may not be identical to color of the seeds, to which the present embodiment is not specifically limited.

Please note, in the present embodiment, if no refresh information has been pulled, the actual refresh progress is zero, and at this time the length of the refresh progress bar does not increase accordingly. In the present embodiment, when the length of the refresh progress bar does not increase, luminance of the moving cursors to be emitted is reduced to a preset value, such as 20%, 30%, or 40% of current transparency, to which the present embodiment is not specifically limited, in order to indicate the current network condition is poor. When the network condition become well, that is, refresh information is pulled again, transparency of the moving cursors is adjusted back to the original value. Of course, transparency of the moving cursors may not be adjusted depending on network condition, to which the present embodiment is not specifically limited. No increase in the length of the refresh progress bar represents that the calculated and output current output length of the refresh progress bar has not changed as compared with the length of refresh progress bar before the moving cursors arrives the refresh progress bar.

204. outputting pulled refresh information when the current length of the refresh progress bar equals to width of the preset animation interface.

In the present embodiment, with increase in pulled data, the refresh progress bar constantly grows in length, and when the length of the refresh progress bar fills width of the entire page, data pulling is completed, and at this time the preset animation interface exits and pulled information is output. Outputting pulled refresh information comprises: outputting data of refreshed information, and outputting the total amount of pulled refresh information in a form of floating window. If 20 pieces of MicroBlog information is pulled, the 20 pieces of information is output on the page, and a text of "a total of 20 pieces of new broadcasts are pulled" is output in form of a floating window, which informs the user the amount of the pulled information. The floating window may be at the bottom or top of the page, to which the present embodiment is not specifically limited.

In order for a person skilled in the art to understand the solution of the present invention well, an example is illustrated below.

Figure 4:
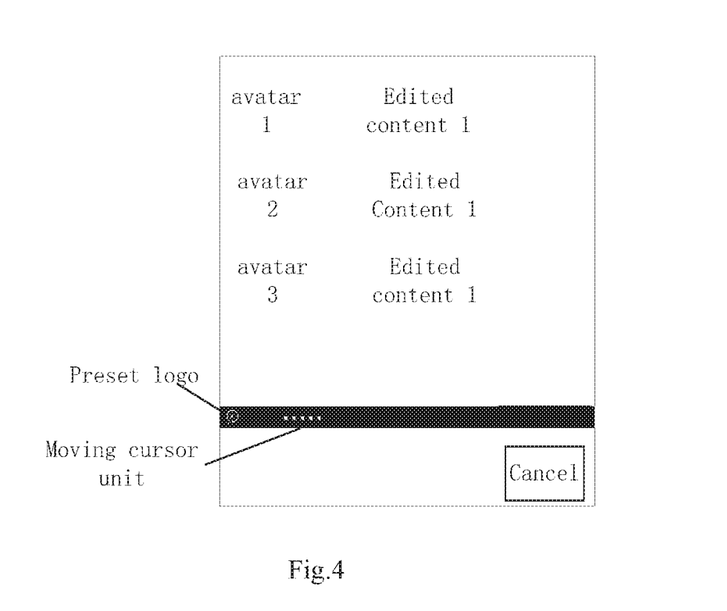
FIG. 4 is a diagram showing a page according to the second embodiment of the invention.
Figure 5:
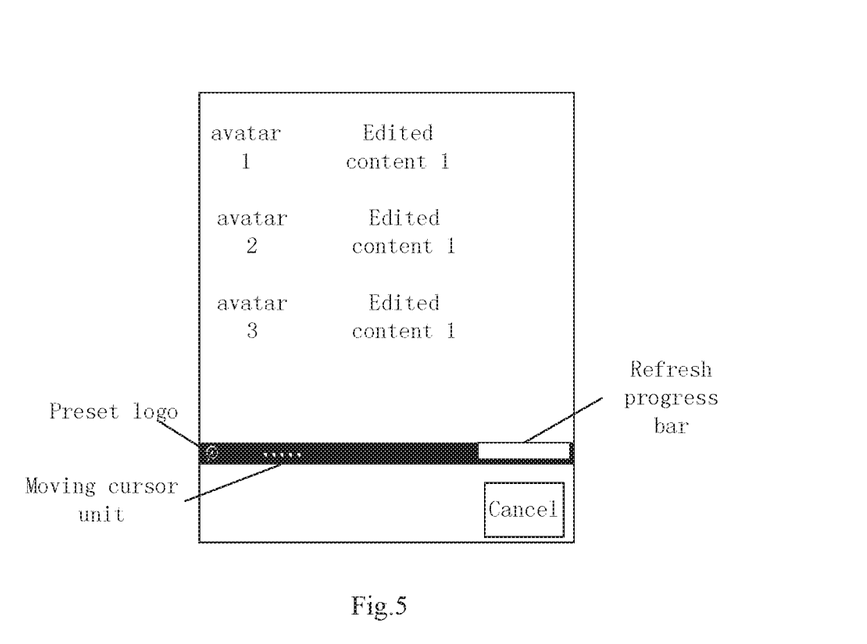
FIG. 5 is a diagram showing a page according to the second embodiment of the invention.
Figure 6:
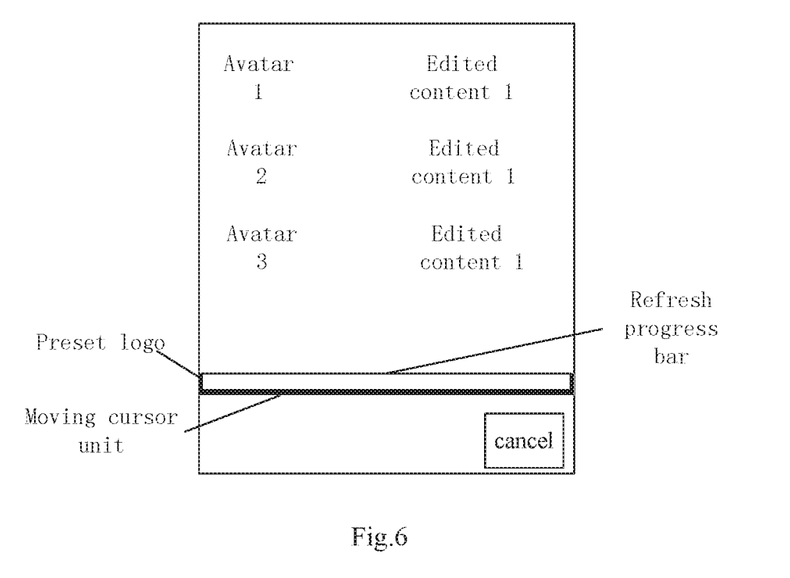
FIG. 6 is a diagram showing a page according to the second embodiment of the invention.
Figure 7:
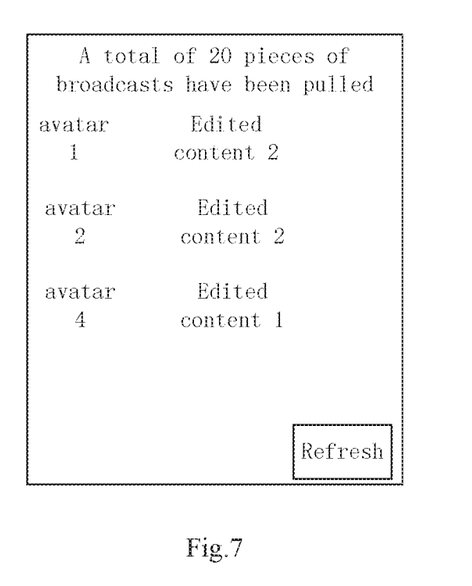
FIG. 7 is a diagram showing a page according to the second embodiment of the invention.

As shown in FIG. 4, avatar 1-edited content 1, avatar 2-edited content 1, avatar 3-edited content 1 are displayed in the current MicroBlog page. When the refresh button in the page is clicked, the preset logo starts to emit moving cursors containing five seeds, and when the moving cursors arrive at edge of the page, the refresh progress bar begins to grow, as shown in FIG. 5. With growth of the refresh progress bar, when the length of the refresh progress bar equals to the width of the page, it is indicated that pulling of data is completed, as shown in FIG. 6. At this point, the preset animation interface exits and pulled data and the amount of pulled data are output, as shown in FIG. 7. Currently, what is displayed on the page are avatar 1-edited content 2, avatar 2-edited content 2, avatar 4-edited content 1, and a newest broadcasting message is displayed on the page to show a total of 20 pieces of new broadcasts have been pulled.

In the present embodiment, if the user clicks the cancel button before completion of pulling of data, the current refreshing operation is canceled and the preset animation interface exit and data of information that has been pulled and total amount of the pulled information are output. For example, when the user clicks the cancel button, 5 pieces of information have been pulled, and then these 5 pieces of information is output and a text of "a total of 5 pieces of new broadcasts have been pulled" is output in form of a floating window to inform the user the total amount of the pulled information.

The present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors move to the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience. The color of the moving cursors may be adjusted depending on network condition such that the user can get to know the current network condition so as to decide whether to continue waiting for refreshing or to cancel the refreshing, and thereby the user's sense of experience can be further improved.

Embodiment 3

Figure 8:
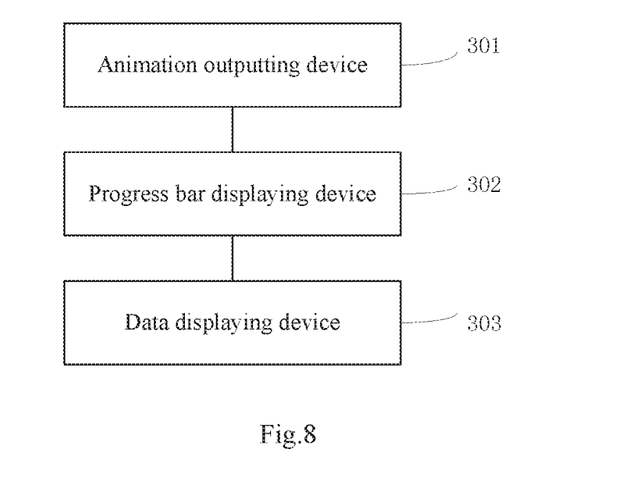
FIG. 8 is a diagram showing structure of an apparatus for page refreshing according to a third embodiment of the invention.

Referring to FIG. 8, an apparatus for page refreshing is provided in the present embodiment. The apparatus comprises: an animation outputting device 301, a progress bar displaying device 302 and a data displaying device 303.

The animation outputting device 301 is configured to output a preset animation interface when a page refreshing operation is performed, wherein the preset animation interface comprising a preset logo, moving cursors, and refresh progress bar, and the moving cursors move to the refresh progress bar starting from the preset logo.

The progress bar displaying device 302 is configured to compute and output current length of the refresh progress bar when it is detected that the moving cursors arrive at the refresh progress bar.

The data displaying device 303 is configured to output pulled refresh information when the current length of the refresh progress bar equals to width of the preset animation interface.

Optionally, the animation outputting device 301 is further configured to:

output the preset animation interface at bottom of the page; or output the preset animation interface at top of the page.

The progress bar displaying device comprises:

an acquiring unit configured to acquire amount of currently pulled refresh information;

a first calculating device configured to calculate actual refresh progress based on the amount of currently pulled refresh information and total amount of refresh information need to be pulled; and a second calculating device configured to obtain the current length of the refresh progress bar by multiplying the actual refresh progress by the width of the preset animation interface.

The data displaying device 303 is further configured to:

output data of refreshed information, and outputting the total amount of pulled refresh information in a form of floating window.

Figure 9:
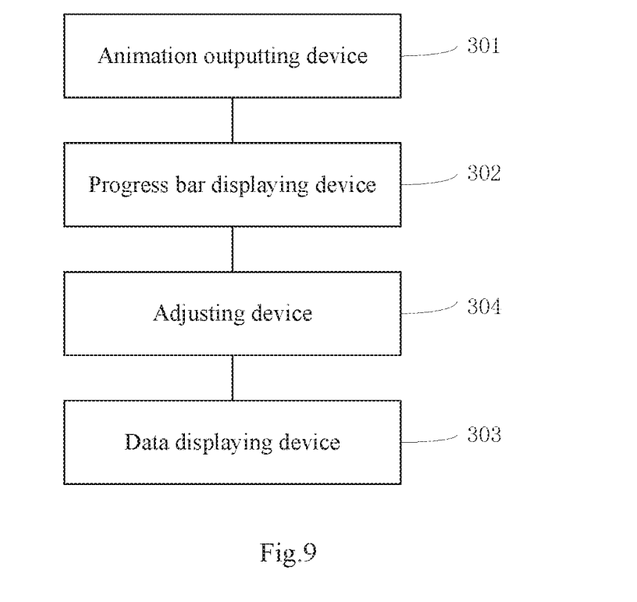
FIG. 9 is a diagram showing structure of an apparatus for page refreshing according to a third embodiment of the invention.

Referring to FIG. 9, optionally, the apparatus further comprises:

an adjusting device 304 configured to reduce transparency of the moving cursor to a predetermined value if length of the refresh progress bar calculated by the progress bar displaying device 302 does not increase.

In the present embodiment, optionally, the moving cursors comprise multiple groups of moving cursor units, and wherein each group of moving cursor units comprises a predetermined number of cursor seeds, and accelerations of each group of moving cursor units are in an arithmetic sequence.

The present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

Embodiment 4

Figure 10:
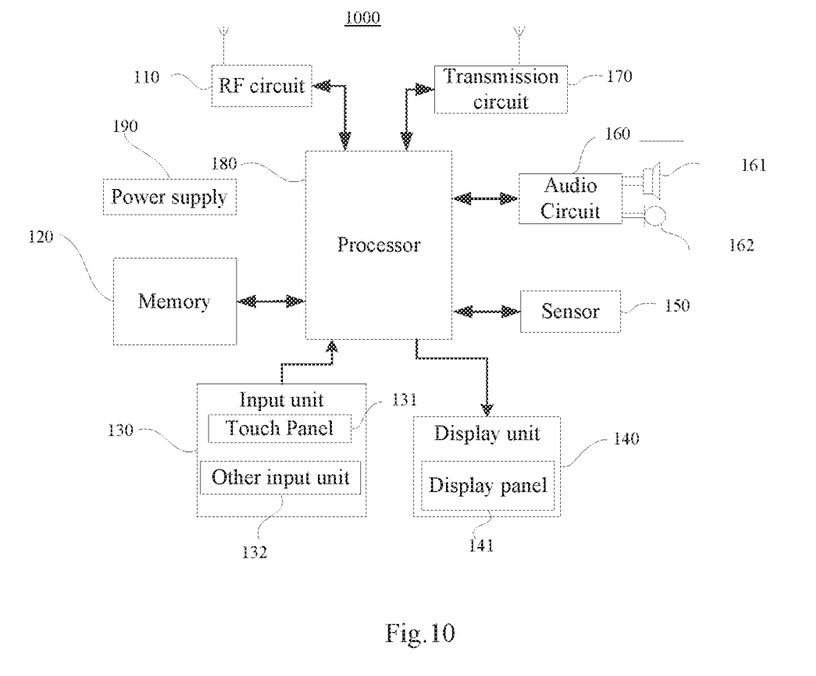
FIG. 10 is a diagram showing a terminal according to a fourth embodiment of the invention.

As shown in FIG. 10, a terminal is proved in the present embodiment. FIG. 10 shows a structure containing a touch screen according to the present embodiment. The terminal can be used for implementing the above described method for page refreshing.

In particular, the terminal 1000 can include a RF (Radio Frequency) circuit 110, a memory 120 comprising one or more computer-readable storage mediums, an input unit 130, a display unit 140, a sensor 150, an audio circuit 160, a transmission module 170, a processor 180 including one or more processing cores and a power supply 190 and other components. A person skilled in the art will appreciate that the terminal structure shown in FIG. 10 does not constitute a limitation of the terminal, but the terminal may include more or fewer components than shown, or a combination of some of the components, or a different arrangement of components.

The RF circuit 110 may be used for receiving and transmitting signals during information transmission and reception or during a call, in particular, for receiving downlink information from a base station and delivers it to one or more processors 180 for further process, and for transmitting uplink information to the base station. Generally, the RF circuit 110 includes, but is not limited to an antenna, at least one amplifier, a tuner, one or more oscillators, a subscriber identity module (SIM) card, a transceiver, a coupler, a LNA (Low Noise Amplifier), a diplexer. In addition, the RF circuit 110 may communicate with other communication devices through wireless communication over a network. The wireless communication can use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) and the like.

The memory 120 can be used to store software programs and modules such as those software programs and modules corresponding to various devices for improving execution speed of an application mentioned in the Embodiment 3. The software programs and modules stored in the memory 120 are executed by the processor 180 to perform various functional applications and data processes in order for improving execution speed of an application, for example. The memory 120 may include a program storage area and a data storage area, wherein the program storage area can store an operating system, applications required by at least one function (such as sound playback, image playback, etc.), and the data storage area can store data (such as audio data, phone book, etc.) according to usage of the terminal 1000. In addition, the memory 120 may include a high-speed random access memory and can also include non-volatile memory, such as at least one disk storage device, flash memory devices, or other volatile solid-state memory devices. Accordingly, the memory 120 may also include a memory controller to control access of the processor 180 and the input unit 130 to the memory access 120.

The input unit 130 may be used to receive input numbers or characters and generates signal inputs of a keyboard, mouse, joystick or trackball related to user's settings and function controls. Specifically, the input unit 130 may include a touch sensitive surface 131 and the other input device 132. The touch sensitive surface 131, also known as touch screen or touch pad, can collect user's touch operations on or near the surface (such as user's operation by using a finger, stylus or any suitable object on or near the touch sensitive surface 131), and drives a corresponding connected device according to a preset program. Optionally, the touch-sensitive surface 131 may include two components, a touch detection device and a touch controller. The touch detection device detects position of the user's touch operation and signal caused by the touch operation, and sends the signal to the touch controller. The touch controller receives touch information from the touch detection device and converts it into touch coordinate and sends it to the processor 180, and the touch controller can receives and performs commands sent from the processor 180. Further, the touch-sensitive surface 131 may be implemented as several types, such as resistive type, capacitive type, infrared type and surface acoustic wave type and the like. In addition to the touch-sensitive surface 131, the input unit 130 may also include other input device 132. Specifically, the other input device 132 may include, but are not limited to one or more of a physical keyboard, function keys (such as volume control key, on/off key, etc.), a trackball, a mouse, a joystick and the like.

The display unit 140 may be used to display information input by a user or information provided to the user, and a variety of graphical user interfaces of the terminal 1000. The graphical user interfaces may consist of graphics, texts, icons, videos and any combination thereof. The display unit 140 may include a display panel 141, and optionally, the display panel 141 may be configured with LCD (Liquid Crystal Display), OLED (Organic Light-Emitting Diode) and the like. Further, the display panel 141 may be covered by the touch-sensitive surface 131, and when the touch-sensitive surface 131 detects a touch operation on or near to it, it transmits to the processor to determine type of the touch event, and then the processor 180 provides a corresponding output on the display panel 141 according to the type of the touch event. In FIG. 10, the touch-sensitive surface 131 and the display panel 141 are shown as two separate components to achieve input and output functions, but in some embodiments, the touch-sensitive surface 131 and the display panel 141 may be integrated to realize the input and output functions.

The terminal 1000 can also include at least one sensor 150, such as light sensors, motion sensors and other sensors. Specifically, an optical sensor may include an ambient light sensor and proximity sensor, wherein the ambient light sensor can adjust brightness of the display panel 141 according to brightness of ambient light, and the proximity sensor, when the terminal 1000 moves to one ear, closes the display panel 141 and/or backlight. As a movement sensor, a gravity sensor may detect size of acceleration in respective directions (typically in three axis), and when it is in a still state, it can detect size and direction of gravity, which can be used for terminal's gesture identification applications (such as horizontal and vertical switch, relevant games, magnetometer attitude calibration), vibration identification related functions (such as a pedometer, percussion) and the like. The terminal 1000 also may be configured as other senses such as a gyroscope, barometer, hygrometer, a thermometer, an infrared sensor and the like, repeated description thereof is omitted.

The audio circuit 160, the speaker 161 and the microphone 162 may provide an audio interface between the user and the terminal 1000. The audio circuit 160 can transmit an electrical signal converted from received audio data to the speaker 161 so and the signal is converted by the speaker 161 a sound for output. On the other hand, the microphone 162 converts collected sound signals into an electrical signal, and the signal is received by the audio circuit 160 to be converted to audio data, and the audio data is output to the processor 180 and undergoes processes and then is transmitted by the RF circuit 110 to another terminal, or the audio data is output to the memory 120 for further processing. The audio circuit 160 may also include an earbud jack to provide a communication between a peripheral headset and the terminal 1000.

The terminal 1000 can help users to send and receive emails, browse web pages and access streaming media etc. through a transmission module 170. The transmission module 170 provides users with wireless or wired broadband Internet accesses. Although the transmission module 170 is shown in FIG. 10, it should be understand that the transmission module 170 is not necessarily incorporated in the terminal 1000, but may be omitted as necessary without changing the nature of the present invention within the scope thereof.

The processor 180 is the control center of the terminal 1000. It connects to various components of the phone through various interfaces and wires, and performs various functions and data processes of the terminal 1000 by running or executing software programs and/or modules stored in the memory 120 and calling the data stored in the memory so as to achieve overall monitoring of the phone. Optionally, the processor 180 may include one or more processing cores. Preferably, the processor 180 may integrate an application processor and a modem processor. The application processor mainly handles the operating system, user interface and applications, and the modem processor mainly handles wireless communications. It should be understand that the modem processor may not be integrated into the processor 180.

The terminal 1000 can also include a power supply 190 (such as a battery) for supplying power for various components, and preferably, the power supply may be logically connected to the processor 180 through a power management system so as to achieve functions of charge, discharge and power consumption management and the like. The power supply 190 may also include one or more AC or DC powers, a recharging system, a power failure detection circuit, a power converter or inverter, a power status indicators and any component.

Although not illustrated, the terminal 1000 may further comprise camera, Bluetooth module, which is not described in detail. In the present embodiment, the displaying unit of the terminal a touch screen displayer, and the terminal comprises a memory, one or more programs, the one or more programs being stored in the memory and configured to be executed by one or more processors, said one or more programs comprise instructions for performing the following operations:

outputting a preset animation interface when a page refreshing operation is performed, wherein the preset animation interface comprising a preset logo, moving cursor, and refresh progress bar, and the moving cursors move to the refresh progress bar starting from the preset logo;

calculating and outputting current length of the refresh progress bar when it is detected that the moving cursors arrive at the refresh progress bar; and outputting pulled refresh information when the current length of the refresh progress bar equals to width of the preset animation interface.

Assuming this is a first possible implementation and for a second possible implementation made on the basis of the first possible implementation, the terminal further contains in the memory an instruction for performing the following operation:

outputting the preset animation interface at bottom of the page; or outputting the preset animation interface at top of the page.

For a third possible implementation made on the basis of the first possible implementation, the terminal further contains in the memory an instruction for performing the following operation:

acquiring amount of currently pulled refresh information;

calculating actual refresh progress based on the amount of currently pulled refresh information and total amount of refresh information need to be pulled; and obtaining the current length of the refresh progress bar by multiplying the actual refresh progress by the width of the preset animation interface.

For a fourth possible implementation made on the basis of the first possible implementation, the terminal further contains in the memory an instruction for performing the following operation:

outputting data of refreshed information, and outputting the total amount of pulled refresh information in a form of floating window.

For a fifth possible implementation made on the basis of the first possible implementation, the terminal further contains in the memory an instruction for performing the following operation:

reducing transparency of the moving cursor to a predetermined value if length of the refresh progress bar does not increase.

For a six possible implementation made on the basis of the first possible implementation, the terminal further contains in the memory an instruction for performing the following operation:

an instruction for performing the following operation:

the moving cursors comprises multiple groups of moving cursor units, and wherein each group of moving cursor units comprises a predetermined number of cursor seeds, and acceleration of each group of moving cursor units is in an arithmetic sequence.

As can be seen, the present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

Embodiment 5

A computer readable storage medium is provided in the present embodiment. The computer readable storage medium may be computer readable storage medium contained in the memory mentioned in the preceding embodiment, or it may exist alone without embodied into any terminal. The computer readable storage medium has one or more programs stored thereon, said one or more programs are executed by one or more processors to perform a sliding control method, the method comprises:

outputting a preset animation interface when a page refreshing operation is performed, wherein the preset animation interface comprising a preset logo, moving cursors, and refresh progress bar, and the moving cursors move to the refresh progress bar starting from the preset logo;

calculating and outputting current length of the refresh progress bar when it is detected that the moving cursors arrive at the refresh progress bar; and outputting pulled refresh information when the current length of the refresh progress bar equals to width of the preset animation interface.

Assuming this is a first possible implementation and for a second possible implementation made on the basis of the first possible implementation, said outputting a preset animation interface comprises:

outputting the preset animation interface at bottom of the page; or outputting the preset animation interface at top of the page.

For a third possible implementation made on the basis of the first possible implementation, said calculating current length of the refresh progress bar comprises:

acquiring amount of currently pulled refresh information;

calculating actual refresh progress based on the amount of currently pulled refresh information and total amount of refresh information need to be pulled; and obtaining the current length of the refresh progress bar by multiplying the actual refresh progress by the width of the preset animation interface.

For a fourth possible implementation made on the basis of the first possible implementation, said outputting pulled refresh information comprises:

outputting data of refreshed information, and outputting the total amount of pulled refresh information in a form of floating window.

For a fifth possible implementation made on the basis of the first possible implementation, the method further comprises:

reducing transparency of the moving cursor to a predetermined value after calculation and outputting of the current length of the refresh progress bar and if length of the refresh progress bar does not increase.

For a sixth possible implementation made on the basis of the first possible implementation, the moving cursors comprises multiple groups of moving cursor units, and wherein each group of moving cursor units comprises a predetermined number of cursor seeds, and acceleration of each group of moving cursor units is in an arithmetic sequence.

The present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

Embodiment 6

A graphic user interface is provided in the present embodiment, wherein the graphic user interface is used in a terminal, the terminal comprises a touch screen displayer, a memory, one or more processors for executing one or more programs, and the graphic user interface comprises:

outputting a preset animation interface when a page refreshing operation is performed, wherein the preset animation interface comprising a preset logo, moving cursors and a refresh progress bar, and the moving cursors move to the refresh progress bar starting from the preset logo;

calculating and outputting current length of the refresh progress bar when it is detected that the moving cursors arrive at the refresh progress bar; and outputting pulled refresh information when the current length of the refresh progress bar equals to width of the preset animation interface.

The present embodiments can attain the following technical effects: when a page refreshing operation is performed, a preset animation interface is output, wherein the preset animation interface comprising a preset logo, moving cursors and a refresh progress bar, and the moving cursors move to the refresh progress bar starting from the preset logo; when it is detected that the moving cursors arrive at the refresh progress bar, current length of the refresh progress bar is calculated and output; and when the current length of the refresh progress bar equals to width of the preset animation interface, pulled refresh information is output. In such a manner, a preset animation interface is output when a page refreshing operation is performed, and thereby users can get better sense of experience.

Please note that the apparatus and terminal for page refreshing in the above mentioned embodiments are described by way of an example in which the apparatus and the terminal respectively are divided into various functional modules. But, in a practical application, the various functions may be performed by different functional modules according to requirements, that is, the internal structure of the apparatus and the terminal may be divided into different functional modules to implement all of or a part of the above mentioned functions. In addition, the method, the apparatus and the terminal for page refreshing described above belong to a same concept, and their specific implementation can be obtained from the method embodiment, and thus repeated description is omitted.

The above mentioned embodiments of the invention are numbered only for description, not representing whether each embodiment is good or not.

A person skilled in the art will understand all of or a part of the steps to implement the above-described embodiments can be accomplished by hardware, or by programs instructing relevant hardware. The programs may be stored in a computer readable storage medium and the storage medium may be read-only memory, magnetic or optical disk and the like.

The above described embodiments are merely preferred embodiments of the invention, but not intended to limit the invention. Any modifications, equivalent alternations and improvements that are made within the spirit and scope of the invention should be included in the protection scope of the invention.

What is claimed is:

1. A method for page refreshing, wherein the method comprises:

outputting a preset animation interface within a graphically displayed page when a page refreshing operation is performed, wherein the preset animation interface is a longitudinal bar with a length substantially equal to a width of the graphically displayed page, wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar, and reducing transparency of the moving cursor to a predetermined value when the length of the refresh progress bar no longer increase.

2. An apparatus for page refreshing, wherein the apparatus comprises:

a processor configured to control:

an animation outputting device to output a preset animation interface within a graphically displayed page when a page refreshing operation is performed,
wherein the preset animation interface is a longitudinal bar with a length substantially equal to a width of the graphically displayed page,
wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar, and an adjusting device to reduce transparency of the moving cursor to a predetermined value when the length of the refresh progress bar no longer increase.

3. A terminal, wherein the terminal comprises a touch screen display, one or more processors, memory and one or more programs, wherein said one or more programs are stored in said memory and are configured to be executed by said one or more processors, said one or more programs comprise instructions for performing the following operations:

outputting a preset animation interface within a graphically displayed page when a page refreshing operation is performed,
wherein the preset animation interface is a longitudinal bar with a length substantially equal to a width of the graphically displayed page,
wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar, and reducing transparency of the moving cursor to a predetermined value when the length of the refresh progress bar no longer increase.

4. A non-transitory computer readable storage medium wherein said computer readable storage medium has one or more programs stored thereon, said one or more programs are executed by one or more processors to perform a sliding control method, wherein said method comprises:

outputting a preset animation interface within a graphically displayed page when a page refreshing operation is performed,
wherein the preset animation interface is a longitudinal bar with a length substantially equal to a width of the graphically displayed page,
wherein the preset animation interface comprises a preset logo, moving cursors and a refresh progress bar, wherein the moving cursors comprise a plurality of cursor seeds emitted from the preset logo and that move toward the refresh progress bar starting from the preset logo along the length of the longitudinal bar in the preset animation interface, wherein the refresh progress bar and the preset logo are positioned apart from each other within the preset animation interface, and wherein a length of the refresh progress bar increases towards the preset logo as the moving cursors arrive at the refresh progress bar, and reducing transparency of the moving cursor to a predetermined value when the length of the refresh progress bar no longer increase.

\* \* \* \* \*